United States Patent
Yu et al.

(10) Patent No.: US 11,311,922 B2
(45) Date of Patent: Apr. 26, 2022

(54) WIRE DRAWING PROCESS OF LIGHT STORAGE WIRE

(71) Applicant: WINN APPLIED MATERIAL, INC., Changhua County (TW)

(72) Inventors: Chung-Ming Yu, Changhua County (TW); Shi-Wei Wang, Changhua County (TW); Shih-Hao Wang, Changhua County (TW)

(73) Assignee: WINN APPLIED MATERIAL INC., Changhua County (TW)

( * ) Notice: Subject to any disclaimer, the term of this patent is extended or adjusted under 35 U.S.C. 154(b) by 208 days.

(21) Appl. No.: 16/793,303

(22) Filed: Feb. 18, 2020

(65) Prior Publication Data
US 2021/0252573 A1 Aug. 19, 2021

(51) Int. Cl.
| | | |
|---|---|---|
| B21C 1/14 | (2006.01) | |
| B21C 1/32 | (2006.01) | |
| B21C 9/00 | (2006.01) | |
| D01D 10/00 | (2006.01) | |
| B29C 48/05 | (2019.01) | |
| B29C 48/78 | (2019.01) | |
| B29C 48/00 | (2019.01) | |
| B29C 48/88 | (2019.01) | |
| D01D 10/06 | (2006.01) | |
| D01D 10/02 | (2006.01) | |
| D01D 1/04 | (2006.01) | |
| D01D 10/04 | (2006.01) | |
| B29C 48/29 | (2019.01) | |
| B29K 75/00 | (2006.01) | |
| B29K 105/00 | (2006.01) | |
| B29K 105/16 | (2006.01) | |

(52) U.S. Cl.
CPC ............ B21C 1/14 (2013.01); B21C 1/32 (2013.01); B21C 9/005 (2013.01); B29C 48/0018 (2019.02); B29C 48/022 (2019.02); B29C 48/05 (2019.02); B29C 48/78 (2019.02); B29C 48/911 (2019.02); D01D 1/04 (2013.01); D01D 10/02 (2013.01); D01D 10/0436 (2013.01); D01D 10/06 (2013.01); *B29C 48/29* (2019.02); *B29K 2075/00* (2013.01); *B29K 2105/0067* (2013.01); *B29K 2105/16* (2013.01)

(58) Field of Classification Search
CPC ....... B29C 48/29; B29C 48/05; B29C 48/022; B29C 48/78; B29C 48/0018; B29C 48/911; D01D 1/04; D01D 10/02; D01D 10/0436; D01D 10/06
See application file for complete search history.

(56) References Cited

U.S. PATENT DOCUMENTS 3,259,681 A * 7/1966 Bull .................. D02J 1/223
264/177.13
3,279,225 A * 10/1966 Knudsen ............ D01D 10/0436
68/181 R (Continued)

*Primary Examiner* — Niki Bakhtiari
*Assistant Examiner* — Emmanuel S Luk
(74) *Attorney, Agent, or Firm* — Guice Patents PLLC

(57) ABSTRACT

A wire drawing process of a light storage wire includes a feeding step, a mixing step, a first drying step, a hot melt extrusion step, a first cooling step, a shaping/organizing wire step, a hot-temperature remodeling step, a stretching step, a second cooling step, a strand winding/rolling step, and a second drying step.

9 Claims, 4 Drawing Sheets

(56) References Cited

U.S. PATENT DOCUMENTS

| | | | | | |
|---|---|---|---|---|---|
| 3,725,523 | A * | 4/1973 | Bowen | | D06B 3/04 264/289.6 |
| 3,859,017 | A * | 1/1975 | Meudec | | B29C 48/09 425/113 |
| 4,001,367 | A * | 1/1977 | Guthrie | | D01D 5/16 264/154 |
| 4,197,381 | A * | 4/1980 | Alia | | C08J 3/226 525/222 |
| 4,476,302 | A * | 10/1984 | Wiezer | | C08G 18/3842 544/198 |
| 4,687,794 | A * | 8/1987 | Huddleston | | B29B 7/183 523/351 |
| 4,814,116 | A * | 3/1989 | Oestreich | | G02B 6/4484 264/1.28 |
| 4,833,026 | A * | 5/1989 | Kausch | | C08J 7/0427 428/315.5 |
| 5,234,720 | A * | 8/1993 | Neal | | D01D 5/253 427/393.1 |
| 5,372,757 | A * | 12/1994 | Schneider | | G02B 6/4484 264/1.28 |
| 6,054,070 | A * | 4/2000 | Tokairin | | B29D 11/00663 264/1.28 |
| 6,634,075 | B1 * | 10/2003 | Lento | | G02B 6/4484 264/1.28 |
| 2002/0063349 | A1 * | 5/2002 | Edwards | | G02B 6/04 264/1.28 |
| 2003/0213547 | A1 * | 11/2003 | Ono | | B29C 70/50 156/149 |
| 2004/0086702 | A1 * | 5/2004 | Morin | | D01F 6/06 428/317.9 |
| 2008/0163663 | A1 * | 7/2008 | Hankey | | H04R 29/008 72/348 |
| 2010/0215895 | A1 * | 8/2010 | Nadkarni | | D01D 5/30 428/90 |
| 2011/0204296 | A1 * | 8/2011 | Conzen | | B29C 48/40 252/502 |
| 2011/0233818 | A1 * | 9/2011 | Koenig | | B29C 48/64 264/211.23 |
| 2013/0236583 | A1 * | 9/2013 | Weinhold | | B29C 48/919 425/143 |
| 2015/0298359 | A1 * | 10/2015 | Pitman | | B29B 9/065 524/584 |
| 2016/0096320 | A1 * | 4/2016 | Bourgoyne | | B29C 48/0019 428/304.4 |
| 2017/0043503 | A1 * | 2/2017 | Suzuki | | B29B 7/94 |
| 2018/0064026 | A1 * | 3/2018 | Ishikawa | | B29C 43/02 |
| 2018/0236703 | A1 * | 8/2018 | Saikin | | B29C 48/34 |
| 2018/0347074 | A1 * | 12/2018 | Humfeld | | D01F 9/32 |
| 2019/0048491 | A1 * | 2/2019 | Bai | | C08K 3/04 |
| 2019/0071796 | A1 * | 3/2019 | Parikh | | A61L 31/06 |
| 2019/0127567 | A1 * | 5/2019 | Carella | | B29C 48/154 |
| 2019/0217522 | A1 * | 7/2019 | Nieto | | B29C 48/465 |
| 2020/0143987 | A1 * | 5/2020 | Amba | | B29C 48/154 |
| 2021/0187813 | A1 * | 6/2021 | Fabry | | B29C 48/92 |

\* cited by examiner

WIRE DRAWING PROCESS OF LIGHT STORAGE WIRE

FIELD OF THE INVENTION

The present invention relates to a wire drawing process of a light storage wire, and more particularly, to a wire drawing process for obtaining a wire that absorbs and stores light. The light emits from the wire in a dark environment. The wire is woven to be a piece of fabric.

BACKGROUND OF THE INVENTION

In order to be more visible in a dark environment, some of the clothes have reflective strips attached thereon. These reflective strips includes patters with fluorescent material added thereto so as to reflect light during night. However, the fluorescent material are broken or peeled off after repeated washing. Another way to obtain light reflective fabric is to add fluorescent material after the yarns are obtained, and the yarns are woven into clothes. The added fluorescent material is not stable and cannot secured to the fabric for a longer period of time.

The present invention intends to provide a wire drawing process of a light storage wire, wherein the wire absorbs and stores light so that light emits from the wire in a dark environment.

SUMMARY OF THE INVENTION

The present invention relates to a wire drawing process of a light storage wire, and comprises the following steps:

a feeding step: preparing and feeding a plurality of thermoplastic polyurethane rubber particles into a mixing drum, and then adding a plurality of inorganic particles in the mixing drum;

a mixing step: using the mixing drum to mix the plurality of thermoplastic polyurethane rubber particles with the inorganic particles;

a first drying step: using a dryer to dry the plurality of mixed thermoplastic polyurethane rubber particles and remove excess water, so as to melt the plurality of thermoplastic polyurethane rubber particles to be adhered with the plurality of inorganic particles, wherein the dryer has a baking temperature of 100° C.~150° C.;

a hot melt extrusion step: transferring the plurality of melted thermoplastic polyurethane rubber particles into a wire stamping machine to perform a stamping process to form an initial wire;

a first cooling step: cooling the initial wire in a cooling tank for a first time cooling process to shape a surface of the initial wire;

a shaping/organizing wire step: organizing the initial wire that passes through a shaping area after the initial wire is cooled in the cooling tank;

a hot-temperature remodeling step: softening the initial wire in a thermoplastic tank after the initial wire passes through the shaping area;

a stretching step: stretching the initial wire in a stretching area after the initial wire is soaked and softened in the thermoplastic tank, wherein the stretching area is formed by a plurality of rollers which are spaced with each other and arranged into rows, and the initial wire is driven and stretched by rotation of each roller;

a second cooling step: cooling the initial wire in an area to be cooled which is located in a rear section of the stretching area after the stretching step, wherein the initial wire is cooled by a natural cooling method to minimize a surface deformation, and to fix an interior structure, so that the initial wire is formed into a semi-finished wire;

a strand winding/rolling step: rolling the semi-finished wire after the second cooling step; and a second drying step: using a dehumidification and drying device to dry the rolled semi-finished wire to further reduce humidity in the semi-finished wire to form a finished wire.

The wire that is made by the process of the present invention has the features of storing light and weavable so that the wires can be directly woven into clothes. The fabrics absorb light so that the fabric emits light in a dark environment for a period of time so as to prevent the nonorganic particles from separating from the fabric. Besides, the thermoplastic polyurethane rubber particles of the wires allow the fabric made of the wires of the present invention to be smoothly attached to clothes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
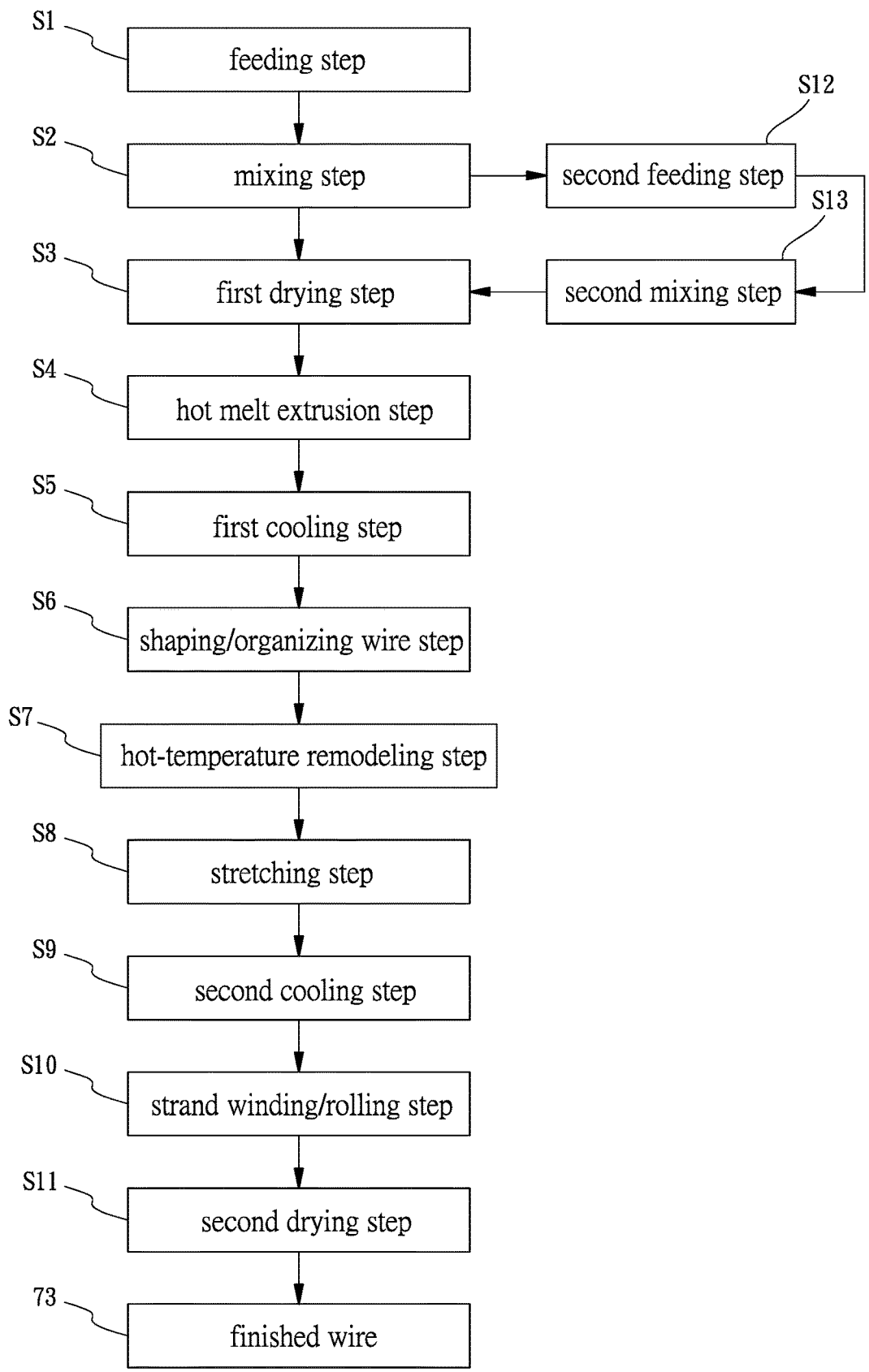
FIG. 1 shows the steps of the process of the present invention.
Figure 2:
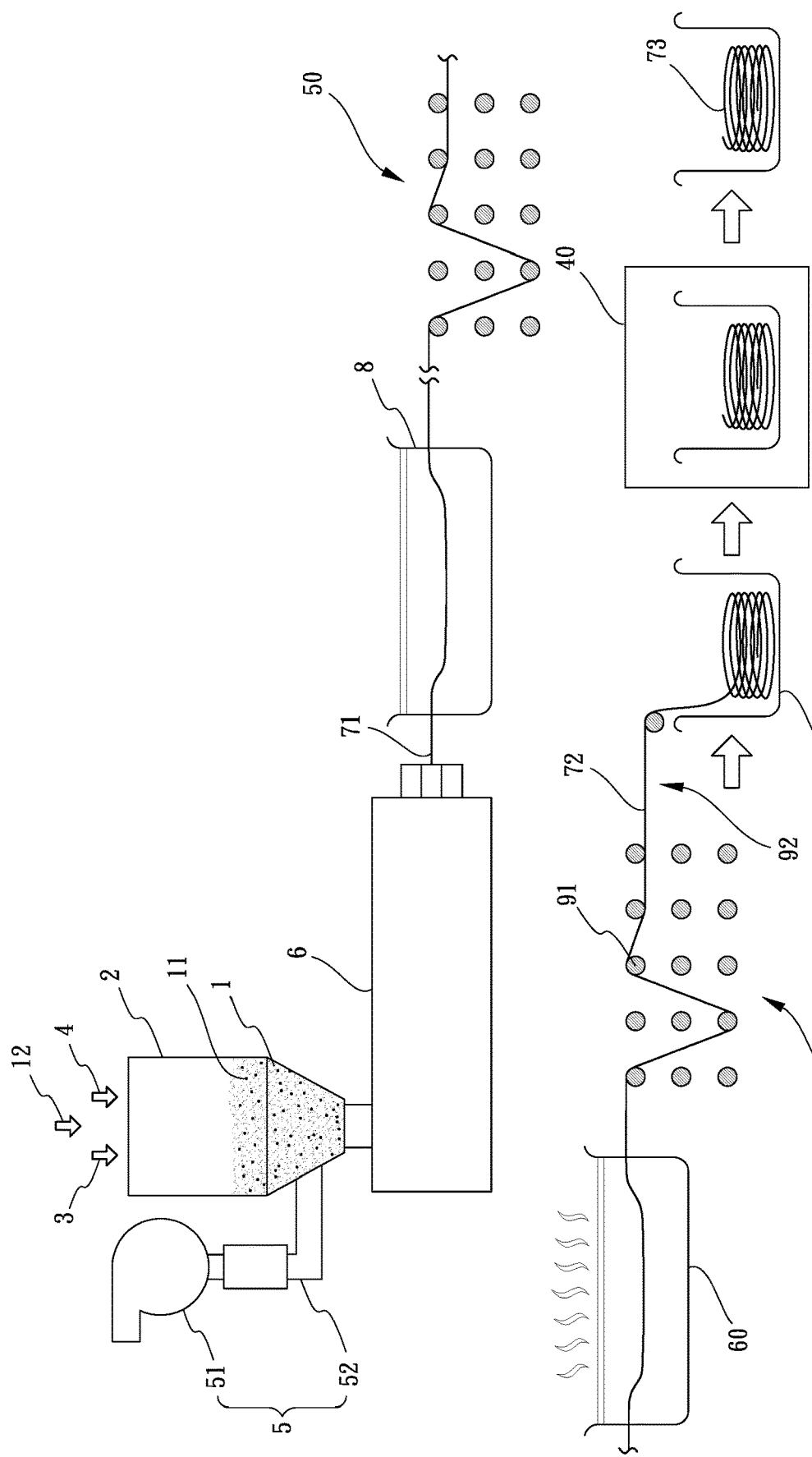
FIG. 2 illustrates the equipment and the steps of the process of the present invention.
Figure 3:
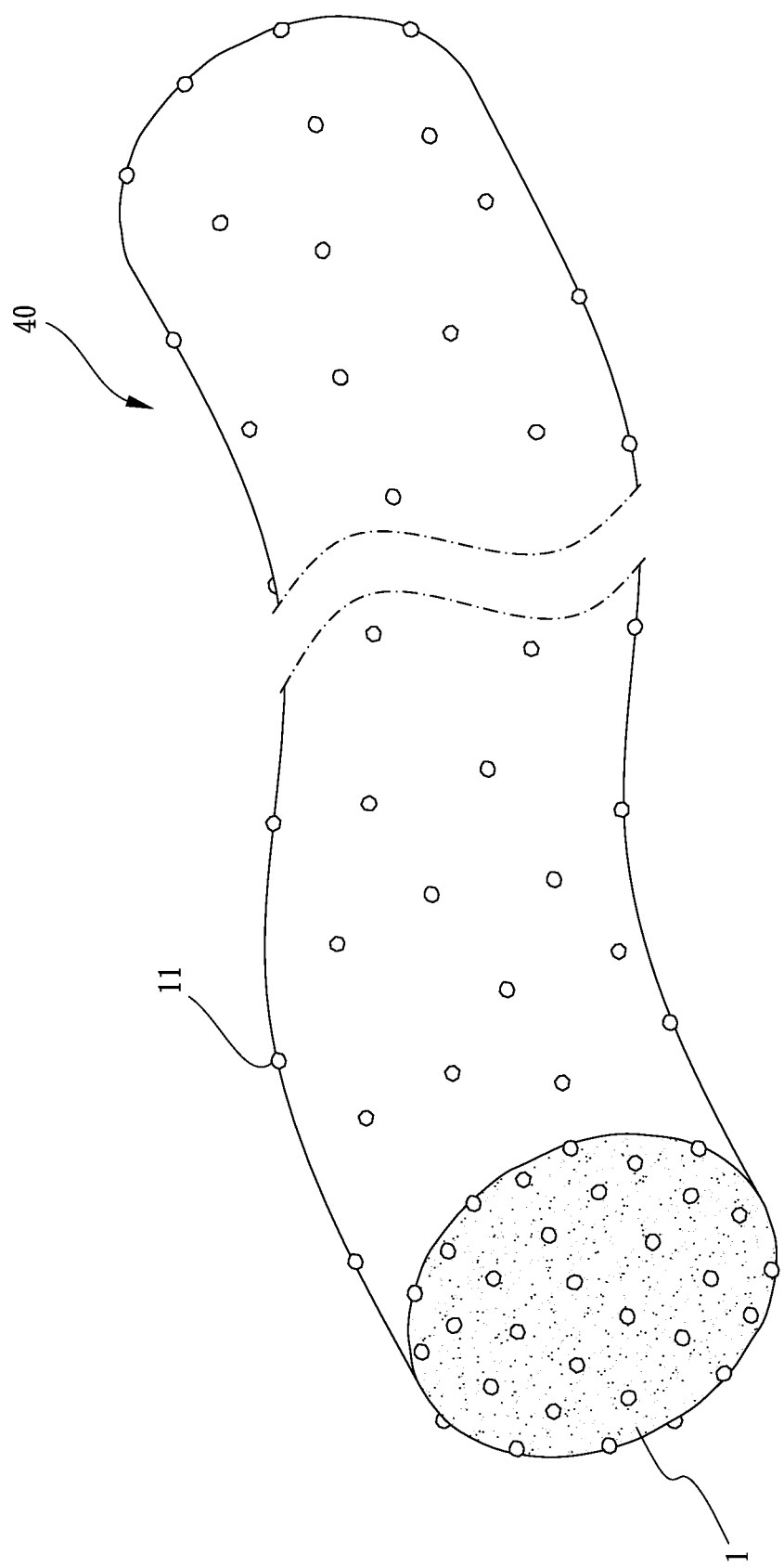
FIG. 3 shows the initial wire made by the process of the present invention.
Figure 4:
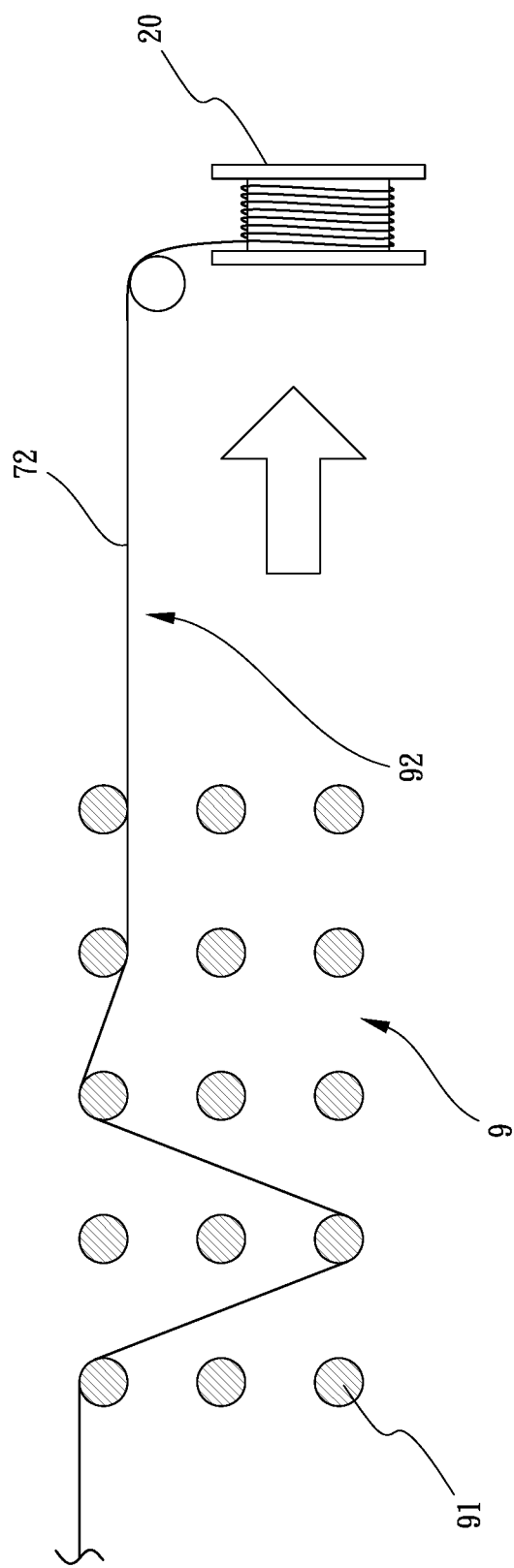
FIG. 4 shows another embodiment of the strand winding/rolling step of the process of the present invention.

Referring to FIGS. 1 to 4, the wire drawing process of a light storage wire of the present invention comprises the following steps:

A feeding step (S1): preparing and feeding a plurality of thermoplastic polyurethane rubber particles 1 into a mixing drum 2, and then adding a plurality of inorganic particles 11 in the mixing drum 2;

A mixing step (S2): using the mixing drum 2 to mix the plurality of thermoplastic polyurethane rubber particles 1 with the inorganic particles 11.

The thermoplastic polyurethane rubber particle 1 is one selected from the group consisting of polyester, polyether, and a mixture thereof, and the thermoplastic polyurethane rubber particle 1 has a melting point of 190° C.~220° C. The mixing step S2 has a mixing time of 3~5 minutes. The inorganic particle 11 is a mineral or a rare earth but not limited thereto, wherein the mineral or the rare earth are ground to be fine particles. A brightener 3 is further added in the mixing step S2, and a proportion of the brightener 3 is equal to 0.2%-0.4% of the total amount of the plurality of thermoplastic polyurethane rubber particles 1. The brightener 3 makes the thermoplastic polyurethane rubber particles 1 to be brighter so that the fabric made of the wires of the present invention looks clean. A proper amount of a pigment 4 is added in the mixing step S2 so that the thermoplastic polyurethane rubber particles 1 have desired colors and the fabric made of the wires of the present invention is colorful.

A first drying step (S3): using a dryer 5 to dry the plurality of the mixed thermoplastic polyurethane rubber particles 1 and remove excess water, so as to melt the plurality of thermoplastic polyurethane rubber particles 1 to be adhered with the plurality of inorganic particles 11, wherein the dryer 5 has a baking temperature of 100° C.~150° C., and the first drying step S3 has a drying time from 15 to 60 minutes so that the thermoplastic polyurethane rubber particles 1 are melted to be semi-liquid status which is mixed with the nonorganic particles 11.

The dryer 5 comprises a blower 51 and a heat pipe 52. The heat pipe 52 is connected between the blower 51 and the mixing drum 2, and the blower 51 blows heat of the heat pipe 52 into the mixing drum 2 to perform a drying process.

A hot melt extrusion step (S4): transferring the plurality of melted thermoplastic polyurethane rubber particles 1 into a wire stamping machine 6 to perform a stamping process to form an initial wire 71;

A first cooling step (S5): cooling the initial wire 71 in a cooling tank 8 for a first time cooling process to shape a surface of the initial wire 71;

A shaping/organizing wire step (S6): organizing the initial wire 71 that passes through a shaping area 50 after the initial wire 71 is cooled in the cooling tank 8;

A hot-temperature remodeling step (S7): softening the initial wire 71 in a thermoplastic tank 60 after the initial wire 71 passes through the shaping area 50, the thermoplastic tank 60 having hot water contained therein which softens the initial wire 71 and heats up to a boiling point in the hot-temperature remodeling step S7;

A stretching step (S8): stretching the initial wire 71 in a stretching area 9 after the initial wire 71 is soaked and softened in the thermoplastic tank 60, wherein the stretching area 9 is formed by a plurality of rollers 91 which are spaced with each other and arranged into rows, and the initial wire 71 is driven and stretched by rotation of each roller 92, wherein the shape and size of the cross section of the initial wire 71 can be controlled by adjusting the tension applied to the initial wire 71 from the rotation of the rollers 91;

A second cooling step (S9): cooling the initial wire 71 in an area to be cooled 92 which is located in a rear section of the stretching area 9 after the stretching step S8, wherein the initial wire 71 is cooled by a natural cooling method to minimize a surface deformation, and to fix an interior structure, so that the initial wire 71 is formed into a semi-finished wire 72;

A strand winding/rolling step (S10): rolling the semi-finished wire 72 after the second cooling step S9, wherein the strand winding/rolling step S10 uses a wheel 20 to wind and roll the semi-finished wire 72 by a coiling method, or uses a container 30 located in the area to be cooled 92 and then the container 30 is rotated to store the semi-finished wire 72, and A second drying step (S11): using a dehumidification and drying device 40 to dry the rolled semi-finished wire 72 for 48 hours to further reduce humidity in the semi-finished wire 72 to form a finished wire 73.

The present invention may be used to manufacture wires of different uses according to needs. Referring to FIG. 1, a second feeding step S12 and a second mixing step S13 are added between the mixing step S2 and the first drying step S3. The second feeding step S12 prepares and feeds a plurality of powders 12 into the mixing drum 2 to be mixed. The plurality of powders 12 includes a fluorescent powder, a reflective powder, or a fine glass powder, the second mixing step S13 has a mixing time from 3 to 5 minutes.

The finished wires 73 made by the process of the present invention can be woven into fabrics which can be easily attached to a surface of another fabric, hard-shell objects, plastic objects. The finished wires 73 absorb light and emits the light in a dark environment.

While we have shown and described the embodiment in accordance with the present invention, it should be clear to those skilled in the art that further embodiments may be made without departing from the scope of the present invention.

What is claimed is:

1. A wire drawing process of a light storage wire, comprising the steps of:
   a feeding step (S1): preparing and feeding a plurality of thermoplastic polyurethane rubber particles into a mixing drum, and then adding a plurality of inorganic particles in the mixing drum;
   a mixing step (S2): using the mixing drum to mix the plurality of thermoplastic polyurethane rubber particles with the inorganic particles;
   a first drying step (S3): using a dryer to dry the plurality of the mixed thermoplastic polyurethane rubber particles and remove excess water, so as to melt the plurality of thermoplastic polyurethane rubber particles to be adhered with the plurality of inorganic particles, wherein the dryer has a baking temperature of 100° C.~150° C.;
   a hot melt extrusion step (S4): transferring the plurality of melted thermoplastic polyurethane rubber particles into a wire stamping machine to perform a stamping process to form an initial wire;
   a first cooling step (S5): cooling the initial wire in a cooling tank for a first time cooling process to shape a surface of the initial wire;
   a shaping/organizing wire step (S6): organizing the initial wire that passes through a shaping area after the initial wire is cooled in the cooling tank;
   hot-temperature remodeling step (S7): softening the initial wire in a thermoplastic tank after the initial wire passes through the shaping area;
   a stretching step (S8): stretching the initial wire in a stretching area after the initial wire is soaked and softened in the thermoplastic tank, wherein the stretching area is formed by a plurality of rollers which are spaced with each other and arranged into rows, and the initial wire is driven and stretched by rotation of each roller;
   a second cooling step (S9): cooling the initial wire in an area to be cooled which is located in a rear section of the stretching area after the stretching step (S8), wherein the initial wire is cooled by a natural cooling method to minimize a surface deformation, and to fix an interior structure, so that the initial wire is formed into a semi-finished wire;
   a strand winding/rolling step (S10): rolling the semi-finished wire after the second cooling step (S9); and
   a second drying step (S11): using a dehumidification and drying device to dry the rolled semi-finished wire to further reduce humidity in the semi-finished wire to form a finished wire.

2. The wire drawing process of a light storage wire as claimed in claim 1, wherein the thermoplastic polyurethane rubber particle is one selected from the group consisting of polyester, polyether, and a mixture thereof, and the thermoplastic polyurethane rubber particle has a melting point of 190° C.~220° C., and the inorganic particle is a mineral or a rare earth.

3. The wire drawing process of a light storage wire as claimed in claim 1, wherein an amount of a pigment is added in the mixing step (S2).

4. The wire drawing process of a light storage wire as claimed in claim 1, wherein the mixing step (S2) has a mixing time of 3~5 minutes.

5. The wire drawing process of a light storage wire as claimed in claim 1, wherein the dryer comprises a blower and a heat pipe, the heat pipe is connected between the blower and the mixing drum, and the blower blows heat of the heat pipe into the mixing drum to perform a drying process.

6. The wire drawing process of a light storage wire as claimed in claim 1, wherein the strand winding/rolling step (S10) uses a wheel to wind and roll the semi-finished wire by a coiling method, or uses a container located in the area to be cooled and then the container is rotated to store the semi-finished wire.

7. The wire drawing process of a light storage wire as claimed in claim 1, wherein the first drying step (S3) has a drying time from 15 to 60 minutes.

8. The wire drawing process of a light storage wire as claimed in claim 1, wherein a second feeding step (S12) and a second mixing step (S13) are added between the mixing step (S2) and the first drying step (S3), the second feeding step (S12) prepares and feeds a plurality of powders into the mixing drum to be mixed, the plurality of powers includes a fluorescent powder, a reflective powder, or a fine glass powder, the second mixing step S13 has a mixing time from 3 to 5 minutes.

9. The wire drawing process of a light storage wire as claimed in claim 1, wherein the thermoplastic tank has hot water contained therein which softens the initial wire and heats up to a boiling point in the hot-temperature remodeling step (S7).

* * * * *